United States Patent
Bien-Aime et al.

(10) Patent No.: US 11,737,601 B1
(45) Date of Patent: Aug. 29, 2023

(54) OVER BURNER GRILL

(71) Applicants: Stanley Bien-Aime, Miramar, FL (US); Carl Saint-Fleur, Coral Springs, FL (US)

(72) Inventors: Stanley Bien-Aime, Miramar, FL (US); Carl Saint-Fleur, Coral Springs, FL (US)

(*) Notice: Subject to any disclaimer, the term of this patent is extended or adjusted under 35 U.S.C. 154(b) by 0 days.

(21) Appl. No.: 17/965,485

(22) Filed: Oct. 13, 2022

(51) Int. Cl.
| | | |
|---|---|---|
| *A47J 37/07* | (2006.01) | |
| *F24C 3/08* | (2006.01) | |
| *F23N 1/00* | (2006.01) | |
| *F24C 3/12* | (2006.01) | |
| *A47J 36/32* | (2006.01) | |
| *H04N 7/18* | (2006.01) | |
| *A47J 37/04* | (2006.01) | |
| *H04N 23/56* | (2023.01) | |
| *H04N 23/50* | (2023.01) | |

(52) U.S. Cl.
CPC ......... *A47J 37/0713* (2013.01); *A47J 36/321* (2018.08); *A47J 37/041* (2013.01); *F23N 1/002* (2013.01); *F24C 3/085* (2013.01); *F24C 3/126* (2013.01); *H04N 7/183* (2013.01); *F23N 2225/08* (2020.01); *F23N 2235/16* (2020.01); *H04N 23/555* (2023.01); *H04N 23/56* (2023.01)

(58) Field of Classification Search
CPC .... A47J 37/0713; A47J 37/041; A47J 36/321; F23N 1/002; F23N 2225/08; F23N 2235/16; F24C 3/085; F24C 3/126; H04N 7/183

USPC ........................................................ 126/41 R
See application file for complete search history.

(56) References Cited

U.S. PATENT DOCUMENTS

| | | | | |
|---|---|---|---|---|
| 4,709,687 | A * | 12/1987 | Barnes | F24C 15/12 |
| | | | | 126/42 |
| 6,079,320 | A * | 6/2000 | Taber | A47J 37/0611 |
| | | | | 99/379 |
| 11,375,725 | B1* | 7/2022 | Morales | A47J 37/041 |
| 2010/0132692 | A1* | 6/2010 | Shaffer | A47J 37/0713 |
| | | | | 99/333 |
| 2011/0123689 | A1* | 5/2011 | Luckhardt | H05B 1/0263 |
| | | | | 426/520 |
| 2012/0037012 | A1* | 2/2012 | Stier | A47J 37/0704 |
| | | | | 99/421 H |
| 2016/0230992 | A1* | 8/2016 | Sweet | F23N 1/002 |

FOREIGN PATENT DOCUMENTS

| | | | | |
|---|---|---|---|---|
| CA | 2650764 | C * | 10/2012 | A23L 5/10 |
| WO | WO-2006129313 | A1 * | 12/2006 | F24C 15/12 |

* cited by examiner

*Primary Examiner* — Avinash A Savani
(74) *Attorney, Agent, or Firm* — Christopher J Vandam, PA; Chris Van Dam

(57) ABSTRACT

A grill for cooking food with a down firing burner affixed to the interior of the lid, above the food cooking surface. Below the food cooking surface is a clear panel that is easy to clean and may include a drain. There is no heat source below the cooking surface. Mechanical or electronic sensors automatically reduce the burner output when the lid begins to open or the handle is grasped anticipating that the lid is about to be opened.

8 Claims, 2 Drawing Sheets

OVER BURNER GRILL

CROSS-REFERENCES TO RELATED APPLICATIONS

None.

STATEMENT REGARDING FEDERAL SPONSORED RESEARCH OR DEVELOPMENT

None.

NAMES OF PARTIES TO A JOINT RESEARCH AGREEMENT

None.

REFERENCE TO A "SEQUENCE LISTING", A TABLE, OR A COMPUTER PROGRAM LISTING APPENDIX SUBMITTED ON COMPACT DISC AND INCORPORATION-BY-REFERENCE OF THE MATERIAL ON THE COMPACT DISCLOSURE

None.

STATEMENT REGARDING PRIOR DISCLOSURES BY AN INVENTOR OR JOINT INVENTOR

None.

BACKGROUND OF THE INVENTION

1. Field of the Invention

The present invention relates to cooking devices, and more particularly, to an improved grill with burners over the cooking surface and smart control features.

2. Description of Related Art Including Information Disclosed Under 37 CFR 1.97 and 37 CFR 1.98

Several designs for grills have been created in the past. None of them, however, includes a burner system above the food being cooked and in easy to clean surface, without burners, below where the food is being cooked. Additional safety features and smart controls further distinguish the design from any prior art.

Applicant believes that the closest prior art references correspond to commonly available outdoor grills. These grills typically employ burners placed under the grill grate surface on which food is cooked. This causes grease and drippings to fall onto the burners which cause corrosion, flame burning, smoke and difficult to clean surfaces. The currently claimed design avoids these hazards by providing the novel and inventive features to direct heat from above the foods being cooked as well as smart features to monitor the cooking and improve safety.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

BRIEF SUMMARY OF THE INVENTION

It is one of the main objects of the present invention to provide a cooking device that is easy to clean and maintain.

It is another object of the present invention to provide an over burner grill that keeps the burner apparatus free from corrosion caused by grease, soot and other food drippings.

It is still another object of the present invention to provide a grill that includes smart features to help the cook monitor and control the cooking environment automatically and/or remotely.

It is yet another object of this invention to provide a grill that operates efficiently and safely.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE SEVERAL VIEWS OF THE DRAWING

With the above and other related objects in view, the invention exists in the details of construction and combination of parts as will be more fully understood from the following description, when read in conjunction with the accompanying drawings in which.

DETAILED DESCRIPTION OF THE INVENTION

Figure 1:
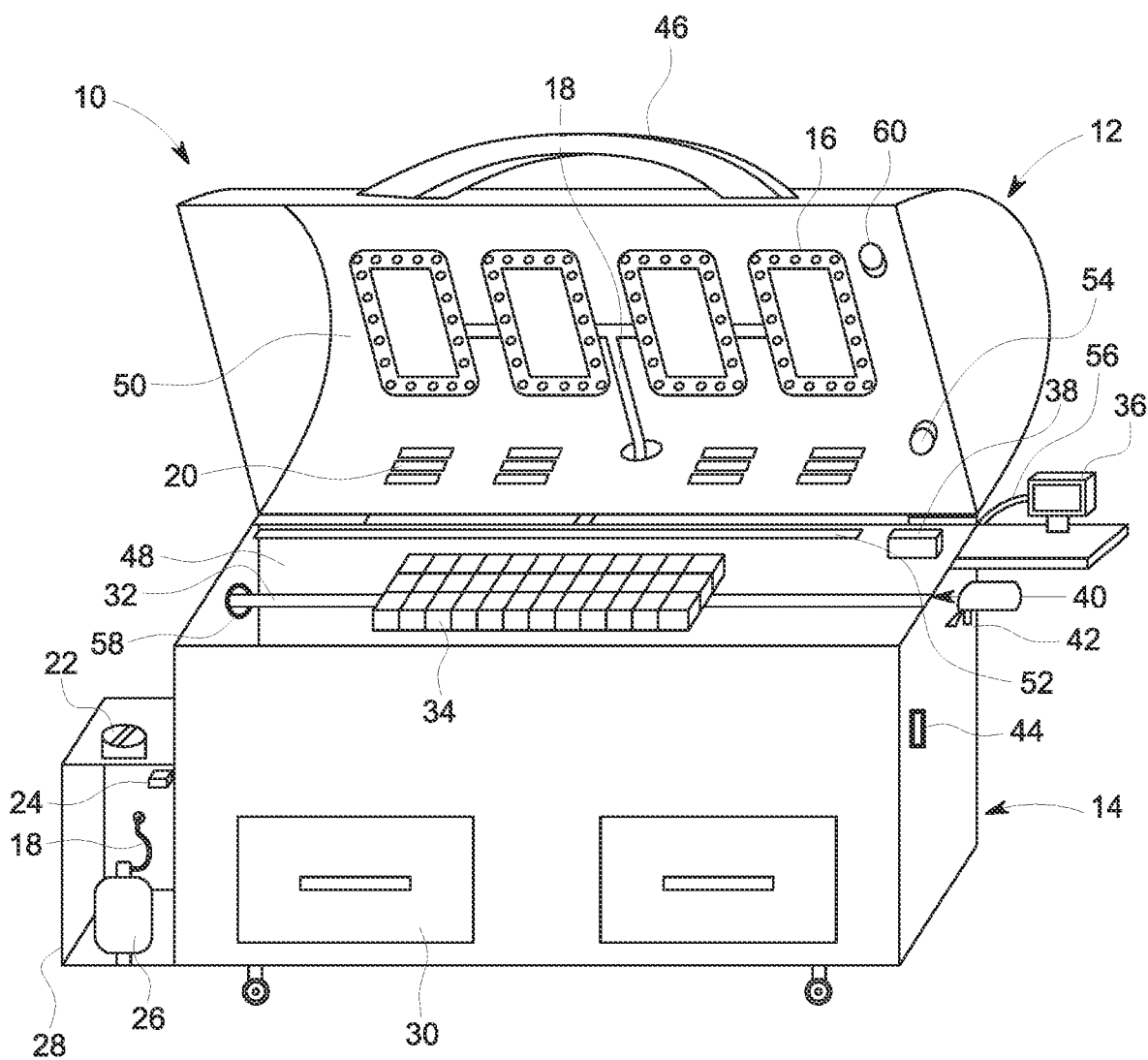
FIG. 1 shows a perspective view of an over burner grill with the lid open.

While this invention may be embodied in many different forms, there are described in detail herein specific embodiments of the invention. This description is exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the device, the invention, the grill, the over burner grill, the cooking device, the machine or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation.

Referring now to the drawings, where the present invention is generally referred to with numeral 10, it can be observed that it basically includes a lid assembly 12, a base assembly 14, burners 16, a conduit 18, vents 20, a manual valve 22, an electric valve 24, a tank 26, a cabinet 28, drawers 30, a shaft 32, a rotisserie basket 34, a computer 36, a sensor 38, a motor 40, a bracket 42, a controller 44, a handle 46, an interior 48, a surface 50, a grate support 52, a light 54, a cable 56, a bearing 58, a camera 60, a drain 62, a sensor 64, a bottom panel 66, a hinge sensor 68, a grate 70, a shelf 74, sides 76 and an aperture 78.

The over burner grill, in an exemplary embodiment, is comprised of a lid assembly 12 and a base assembly 14. A cabinet 28 may be affixed to a side of the base assembly 14. The lid assembly 12 includes one or more hinges on a rear side that affixed to a upper rear edge of the base assembly 14. This allows the lid assembly 14 to open and close to expose the interior 48 of the over burner grill.

The base assembly 14 may include one or more drawers 30 for storage of items that may be used when using the over burner grill. The cabinet 28 is dimensioned and adapted to hold a tank 26 of cooking fuel. For example, the tank 27 may contain propane. In other versions of the grill other fuel sources may also be effectively utilized. For example, liquefied natural gas supplied to many homes may be directly connected without using a tank 26 as a fuel source.

On an interior surface 50 of the lid assembly 12 are affixed one or more burners 16. The burners 16 are connected be a conduit 18 to the fuel supply, such as the tank 26. When the lid assembly 12 is closed the burners 16 are positioned above the interior 48 where the food is being cooked.

Where more than one burner 16 is provided, each may be independently controlled to adjust the intensity of the heat provided by the individual burner 16. For some cooking methods an individual burner 16 may be turned completely off while other burners 16 remain lit. This can permit indirect heating for certain techniques. For example, if the food is positioned on the left side of the interior 48 the left burners may be turned off to allow for indirect heat from only the ignited right burners. Similarly, if only half of the grate 70 surface is being used to hold food, the burners above that food may be the only ones lit to conserve additional fuel.

The interior surface 50 of the lid assembly 12 may have a heat reflective coating to direct energy downward onto the food surface below the burners 16. The surface 50 may also include an insulating layer to capture heat inside the lid assembly 12 and directed downward toward cooking food.

By having the burners 16 above the food cooking, any grease, grime, drippings or bits falling off of the food being cooked will not contact the burners 16 directly. Anything falling from the cooking food will fall into the bottom panel 66 where there are no burners 16 to corrode and will be easy to clean. Also, by having the burners 16 above the cooking food, ignitable drippings will not catch fire onto a burner below the food, as happens in traditional under burner grills.

Some versions of the over burner grill include a computer 36 controlled electronics package. The computer 36 may be connected by cable 56 to a light 54 to illuminate the interior 48 of the grill. The light 54 may be used in combination with the camera 60, also on the interior of the lid assembly 12. While the light 54 may be used to illuminate an image captured by the camera 60, the light 54 may also be used alone with the lid open. The camera 60 is also connected to the computer 36 via cable 56.

The computer 36 may also be connected to a sensor 38 on the interior 48 of the grill. The sensor 38 can gather certain parameters of the conditions inside the grill. For example, the sensor 38 may be capable of measuring the temperature, the humidity or the smoke particulate level inside the interior 48 of the grill. The sensor 38 is also connected to the computer 36 via cable 56.

The computer 36 may also be connected by cable 56 to the electric valve 24. When connected in this way, the electric valve 24 can be controlled by the computer 36 automatically when monitoring certain parameters or manually by the operator. For example, when the computer 36 is operably connected to the sensor 38 to measure the temperature, the electrical valve 24 may be manipulated to maintain a specified temperature on the interior 48 of the grill.

Similarly, the computer 36 connected to the camera 60, may be able to determine the color of the food being cooked and the changes in color as the food progressively cooks more. For example, the camera 60 may be monitoring a pink, raw piece of meat and as the meat color darkens the camera detects the change in color and can reduce or extinguish the burners 16 appropriately.

The computer 36 may have preprogrammed recipes and functions that can be selected on the display 72. The display 72 may be touch screen so that the operator of the grill can control the electronic features entirely through the computer 36. This can include everything from ignition of the burners 16, extinguishing the burners 16, adjusting the electrical valve 24 to control the intensity of the burners 16, the light 54, the camera 60 and the rotisserie motor 40.

The computer 36 may be wirelessly connected to a personal computing device of the user. For example, a user's smart device may include a software application that interfaces with the computer 36 to wirelessly control all of the features of the over burner grill.

Figure 2:
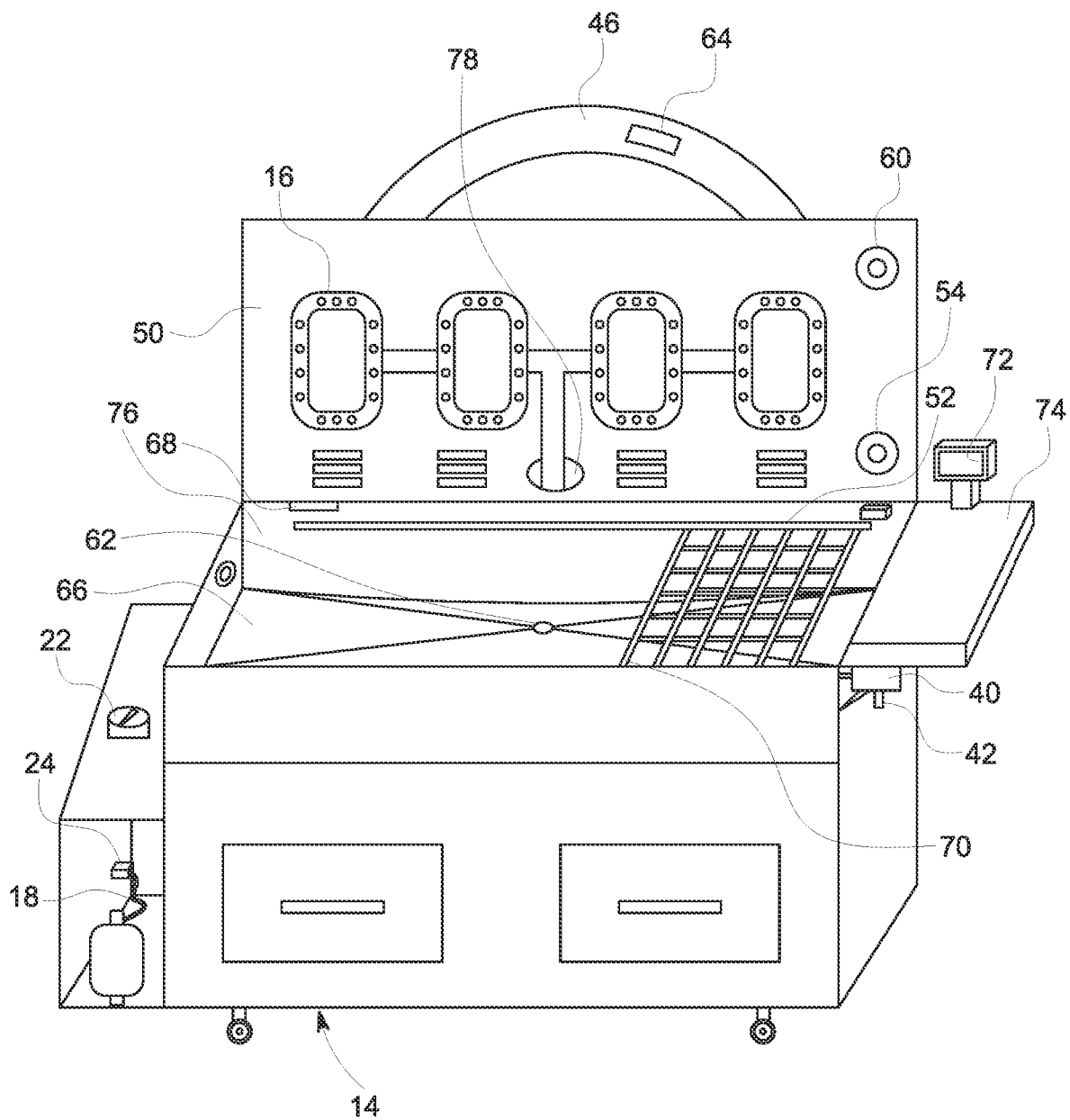
FIG. 2 shows a perspective view of an over burner grill demonstrating different features of the device.

The grill is adapted to use a variety of food supporting devices. Along opposing upper edges of the base assembly 14 are grate supports 52. A grate, such as the grate 70 shown in FIG. 2, is supported by the grate supports 52. Multiple grates 70 may be used to cover part or the entire width of the grill or a single grate 70 may span the entire width.

The grill also may be adapted to support a rotisserie basket 34 under the burners 16. An example of a rotisserie basket 34 is shown in FIG. 1. The rotisserie basket 34 may be supported by a shaft 32 that on one end rotates on a bearing 58 and on the opposing and is connected to a motor 40 that provides a rotational motion onto the rotisserie basket 34. A bracket 42 may support the motor 40.

The rotisserie basket 34 is typically used when the grates 70 are removed from the base assembly 14. The grates 70 may be stored in a drawer 30. The rotisserie basket 34 is suited for certain cooking that benefits from being rotated on a spit. For example, vegetables, fish or other delicate foods that benefit from constant rotation may be best cooked with the rotisserie basket 34 rotating on the shaft 32 under the burners 16.

The interior 48 of the base assembly 14 has a bottom panel 66 that catches anything falling from the food. For example, grease and food bits will fall onto the generally smooth bottom panel 66 where they can be later wiped up or will fall out the drain 62 in the surface of the bottom panel 66. In this way, the interior of the grill is easily cleaned by simply wiping or with the aid of a degreaser. There are no burners in the interior 48 of the base assembly 14 as found in traditional grills so the bottom panel 66 is easily cleaned.

In one version of the over burner grill the output of the burners 16 is controlled manually by the manual valve 22. With the manual valve 22, the computer 36 may not be necessary. A standard thermometer may be included in the lid assembly 12 to show the current temperature. Additionally, the computer 36 may be present to control the other feature such as the sensor 38, light 54 and camera 60.

The manual valve 22 may also be connected to a mechanical linkage or the hinge 68 so that when the lid assembly 12 begins to open, the burners 16 are immediately reduced to avoid the flame from the burner escaping from the opening lid and burning the operator. The mechanical linkage at the hinge or along the opening of the lid will reduce the gas flow to the burners to a trickle. The burners 16 will remain lit but minimally so to reduce the risk of burn injury as the lid is being opened.

In an electronic version of the grill, sensors 64 and/or a hinge sensor 68 may be present and connected to the electronic valve 24 controlling the gas supplied to the burners 16. These sensors 64 and 68 may optionally be integrated with the computer 36. If an operator of the grill grabs the handle 46 and touches the sensor 64, the grill understands that the lid assembly 12 may be about to open. The sensor 64 sends a signal to the electronic valve 24 to idle the gas passing through the conduit 18 to the burners 16 so that when the lid assembly 12 is opened the flames from the burners 16 do not rise upward to where the operator's hands may be. A similar means to achieve the same results may include a hinge sensor 68 that is likewise connected to the electronic valve 24 or the manual valve 22. When the hinge between the lid assembly 12 and the base assembly 14 begins to move the hinge sensor 68 recognizes that the lid assembly 12 is about to open and likewise idles the gas flow to the burners 16.

A controller 44 may optionally be present to toggle the motor 40 on and off for the rotisserie feature. A motor 40 turns the shaft 32 that in turn rotates the rotisserie basket 34. The shaft 32 and rotisserie basket 34 may be removed to install stationery grates 70, such as shown in FIG. 2.

Vents 20 may be positioned optionally on the lid or rear interior surface of the base assembly 13. The vents 20 may include louvers or other adjustable closure means to selectively determine the amount of fresh air allowed to enter the interior 48 of the grill.

The bottom panel 66 and sides 76 of the interior 48 may be coated with an enamel or other non-stick coating. Because these surfaces are generally not in direct contact with the flame emanating from the burner, even an unfinished stainless steel surface will be easy to wipe clean from any drippings from the food that fall. A drain 62 may also be provided that allows excessive drippings or droppings to be collected underneath the bottom panel 66.

It should be appreciated throughout the specification and claims that the term cooking surface is intended to include grill grates 70, a rotisserie basket 34 or any other structure or feature that supports the food underneath the overhead burners 16. Other forms of rotisserie structures are equally included, such as a spit, a basket or a tine cage.

The computer 36 may be programmed with specific recipes to assist the user in managing the appropriate time and temperature for specific foods. The computer 36 may include a display 72 where timers, temperatures and information from the environmental sensors may be displayed. In one version of the over burner grill all of the information controls provided by the computer 36 may also be wirelessly transmitted to a portable personal device, such as a smart phone or other computing device remote from the grill.

An important version of the invention can be fairly described as a grill having a base assembly and a lid assembly. The base assembly has an interior cooking volume bounded on a lower side with a generally planer bottom panel and on an upper side with a cooking surface, such as a grill grate or rotisserie. The bottom panel may be angled or contoured to allow gravity to assist guiding drippings out a drain. Generally, there is no heat source underneath the cooking surface. All of the heat energy used to cooked the food is produced by burners above the cooking surface. This is done with a burner, or burners, affixed to an interior surface of the lid assembly that is directed down toward the cooking surface. The burner consumes a cooking gas, such as propane or natural gas, and is controlled by a valve. In some versions of the grill the burners are controlled with a manual valve. In other versions, electronic sensors in combination with an electronic valve can help automate the processes relating to firing the burners, temperature, monitoring the environmental conditions inside the grill and to light and view the food while cooking. A sensor is provided associated with the lid assembly to reduce the heat output produced by the burner when the lid assembly begins to move from a closed position. For example, an electronic sensor or manual linkage may serve to promptly limit the gas flow as the lid is opening or is about to open. This will prevent excessive heat and exhaust gas produced by the burners from injuring the operator of the grill as the lid is being opened. The cooking surface may equally be a grate or a rotating rotisserie of any design. Optionally, the lid of the grill includes a light that shines on the cooking surface, a camera to visualize the food as it is in a closed grill or as it may be viewed in an open grill from a remote location. Optionally an environmental sensor is also connected to the computer that may further measure and record conditions such as temperature, humidity or a smoke content in the atmosphere inside the grill. Any of the features that are accessed or controlled by the onboard computer may also be wirelessly transmitted to a remote electronic device, for example a smart phone. Other versions of the inventive concept are more reliant on electronic controls. For example, the handle of the lid may include a sensor that as the operator touches the handle to open the lid, the burners are throttled back before the lid is actually opened. Other such sensors to indicate an active or imminent opening of the lid to may be found in a hinge or contact points between the lid and the base assemblies. The computer associated with the grill is operably connected to an electric gas valve, a camera, a light, an environmental sensor, the rotisserie motor and a display to provide real-time information to the operator of the over burner grill.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

We claim:

1. A grill comprised of a base assembly and a lid assembly;
    the base assembly has an interior cooking volume that is bounded on a lower side with a bottom panel and on an upper side with a rotisserie oriented horizontally over the interior cooking volume;
    there is no heat source below the rotisserie;

a burner is affixed to an interior surface of the lid assembly;

the burner is directed down toward the rotisserie;

the burner is operably connected to a valve and a cooking gas supply;

a food is affixed to the rotisserie and the rotisserie rotates the food within the interior cooking volume;

a sensor is operably configured with the lid assembly to reduce a heat produced by restricting the cooking gas supply to the burner when the lid assembly is moved from a closed position.

2. The grill of claim 1 further characterized in that the interior surface of the lid includes a light, a camera and an environmental sensor operably connected to a computer.

3. The grill of claim 2 further characterized in that the environmental sensor measures any of a temperature, a humidity or a smoke.

4. The grill of claim 2 further characterized in that the computer is wirelessly connected to a personal electronic device and configured to receive a first data from the environmental sensor and an image from the camera.

5. A grill comprised of a base assembly, a lid assembly and a computer;

the base assembly has an interior cooking volume that is bounded on a lower side with a bottom panel and on an upper side with a rotisserie oriented horizontally over the interior cooking volume;

there is no heat source below the rotisserie;

a burner is affixed to an interior surface of the lid assembly;

the burner is directed down toward the rotisserie;

the burner is operably connected to an electronic valve and a cooking gas supply;

a food is affixed to the rotisserie and the rotisserie rotates the food within the interior cooking volume;

the computer is operably connected to the electronic valve and an environmental sensor;

the environmental sensor measures a cooking temperature adjacent to the rotisserie and sends the cooking temperature to the computer;

the computer is programmed with a target temperature;

the computer controls the electronic valve to affect a rate the cooking gas is supplied to the burner to adjust the cooking temperature to match the target temperature;

a lid sensor is operably configured with the lid assembly to control the electronic valve to reduce a heat produced by restricting the cooking gas supply to the burner when the lid assembly is moved from a closed position or when a lid handle is grasped.

6. The grill of claim 5 further characterized in that the interior surface of the lid includes a light and a camera operably connected to a computer.

7. The grill of claim 5 further characterized in that the environmental sensor additionally measures a humidity.

8. The grill of claim 5 further characterized in that the computer is wirelessly connected to a personal electronic device and configured to receive a first data from the environmental sensor and an image from the camera.

* * * * *